(12) United States Patent
Mikami et al.

(10) Patent No.: US 12,278,051 B2
(45) Date of Patent: Apr. 15, 2025

(54) MULTILAYER CERAMIC CAPACITOR

(71) Applicant: Murata Manufacturing Co., Ltd., Nagaokakyo (JP)

(72) Inventors: Yuu Mikami, Nagaokakyo (JP); Tatsuya Izumi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 209 days.

(21) Appl. No.: 18/122,841

(22) Filed: Mar. 17, 2023

(65) Prior Publication Data

US 2023/0335339 A1 Oct. 19, 2023

(30) Foreign Application Priority Data

Apr. 19, 2022 (JP) .................................. 2022-068933

(51) Int. Cl.
| | |
|---|---|
| *H01G 4/12* | (2006.01) |
| *H01G 4/008* | (2006.01) |
| *H01G 4/012* | (2006.01) |
| *H01G 4/30* | (2006.01) |

(52) U.S. Cl.
CPC .......... *H01G 4/1227* (2013.01); *H01G 4/008* (2013.01); *H01G 4/012* (2013.01); *H01G 4/30* (2013.01)

(58) Field of Classification Search
CPC .................................. H01G 4/012; H01G 4/30
See application file for complete search history.

(56) References Cited

U.S. PATENT DOCUMENTS

| | | | | |
|---|---|---|---|---|
| 5,119,062 | A * | 6/1992 | Nakamura | ............... H01C 7/10 338/21 |
| 6,052,272 | A * | 4/2000 | Kuroda | .................. H01G 4/385 361/321.1 |
| 2007/0002519 | A1 * | 1/2007 | Li | ............................ H01G 4/30 361/303 |
| 2013/0100576 | A1 * | 4/2013 | Seo | ........................ H01G 4/005 361/301.4 |
| 2014/0252403 | A1 * | 9/2014 | Feichtinger | ........ H10H 20/8583 257/99 |
| 2016/0099105 | A1 * | 4/2016 | Lee | ......................... H01G 2/065 361/301.4 |
| 2017/0186552 | A1 * | 6/2017 | Abe | ......................... H01G 4/40 |

FOREIGN PATENT DOCUMENTS

| | | | | |
|---|---|---|---|---|
| CA | 2560027 A1 * | 3/2008 | | .............. H01G 2/14 |
| JP | 08-45776 A | 2/1996 | | |

* cited by examiner

*Primary Examiner* — Nathan Milakovich
(74) *Attorney, Agent, or Firm* — Keating & Bennett, LLP

(57) ABSTRACT

A multilayer ceramic capacitor includes a multilayer body including laminated dielectric layers, internal electrode layers on the dielectric layers, first and second main surfaces opposed to each other in a lamination direction, first and second lateral surfaces opposed to each other in a width direction orthogonal or substantially orthogonal to the lamination direction, and first and second end surfaces opposed to each other in a length direction orthogonal or substantially orthogonal to the lamination direction and the width direction, and a first external electrode on the first main surface and a second external electrode on the second main surface, in which a portion or all of the internal electrode layers are not connected to any of the first external electrode or the second external electrode.

20 Claims, 6 Drawing Sheets

MULTILAYER CERAMIC CAPACITOR

CROSS REFERENCE TO RELATED APPLICATIONS

This application claims the benefit of priority to Japanese Patent Application No. 2022-068933 filed on Apr. 19, 2022. The entire contents of this application are hereby incorporated herein by reference.

BACKGROUND OF THE INVENTION

1. Field of the Invention

The present invention relates to a multilayer ceramic capacitor.

2. Description of the Related Art

Conventionally, a multilayer ceramic capacitor for the purpose of lowering capacitance has been proposed. Japanese Unexamined Patent Application Publication No. H8-45776 discloses a multilayer ceramic capacitor in which one internal electrode is provided inside the dielectric and the internal electrode is not connected to the external electrode.

SUMMARY OF THE INVENTION

In the conventional multilayer ceramic capacitors, there is a possibility that the internal electrode is opposed to the external electrode or the internal electrode is opposed to the land of the board. When the internal electrode is opposed to them, a stray capacitance may be generated in the internal electrode. Such a stray capacitance is an unintended capacitance and is not preferable for characteristics of the multilayer ceramic capacitor.

Preferred embodiments of the present invention provide multilayer ceramic capacitors that are each able to reduce the generation of stray capacitance.

A multilayer ceramic capacitor according to a preferred embodiment of the present invention includes a multilayer body including a plurality of laminated dielectric layers, a plurality of internal electrode layers laminated on the dielectric layers, a first main surface and a second main surface which are opposed to each other in a lamination direction, a first lateral surface and a second lateral surface which are opposed to each other in a width direction orthogonal or substantially orthogonal to the lamination direction, and a first end surface and a second end surface which are opposed to each other in a length direction orthogonal or substantially orthogonal to the lamination direction and the width direction, and a first external electrode on the first main surface and a second external electrode on the second main surface, in which a portion or all of the plurality of internal electrode layers are not connected to any of the first external electrode or the second external electrode.

According to a preferred embodiment of the present invention, it is possible to provide multilayer ceramic capacitors that are each able to reduce the generation of unintended stray capacitance.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
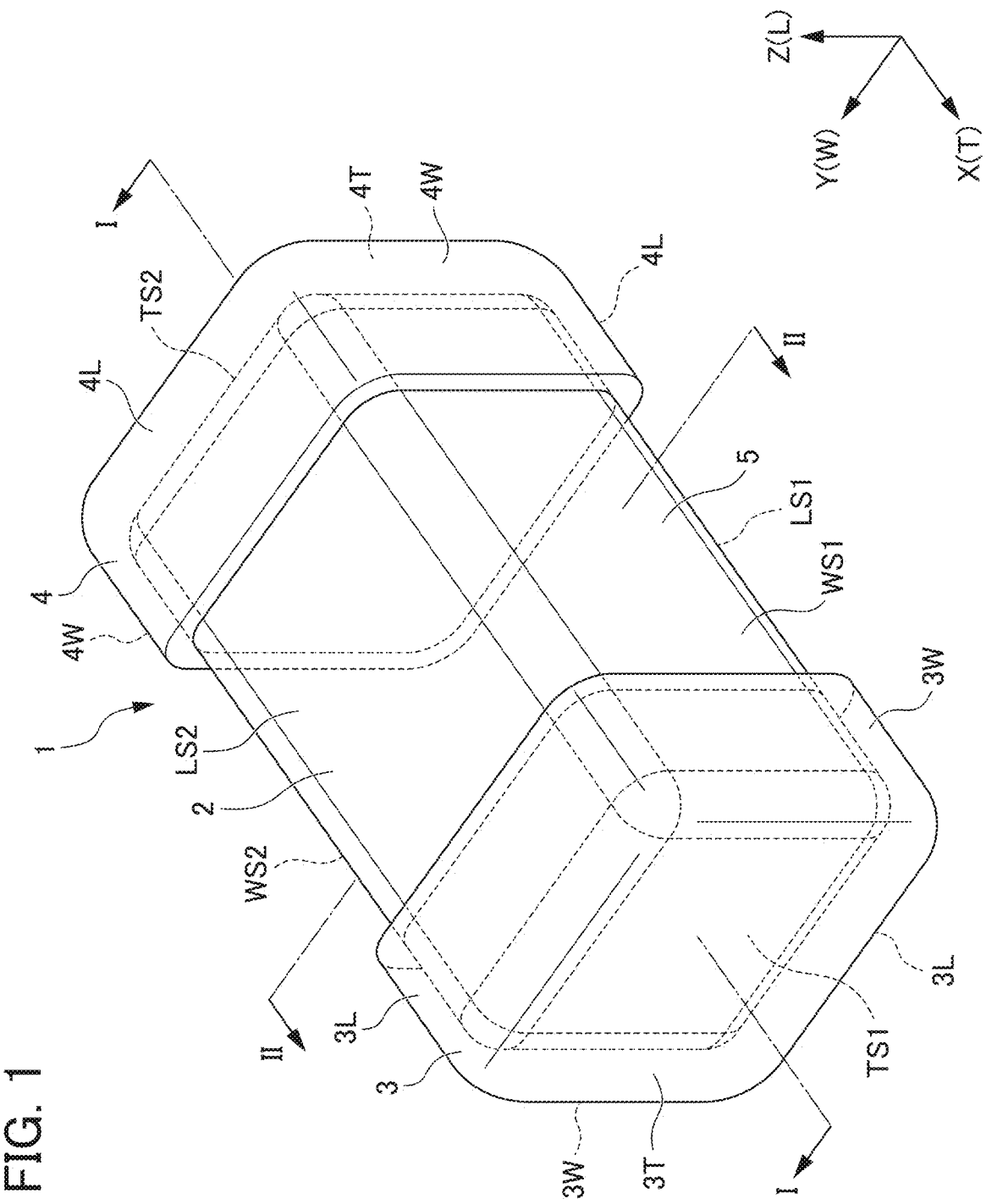
FIG. 1 is a perspective view showing a multilayer ceramic capacitor according to a preferred embodiment of the present invention.

Preferred embodiments of the present invention will now be described with reference to the accompanying drawings. In the drawings, the same or corresponding portions are denoted by the same reference numerals.

Structure of Multilayer Ceramic Capacitor

Figure 2:
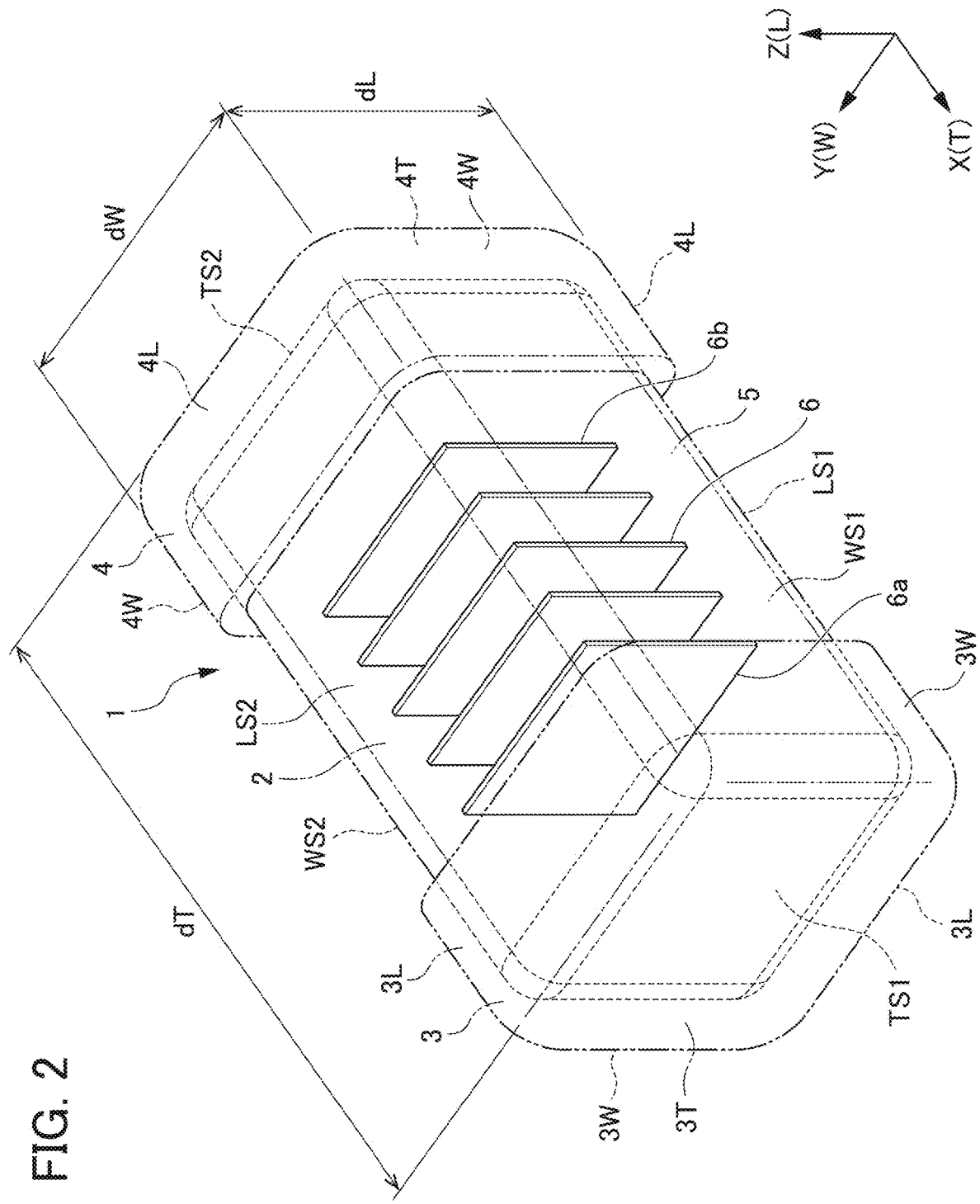
FIG. 2 is a perspective view showing a multilayer ceramic capacitor according to a preferred embodiment of the present invention.
Figure 3:
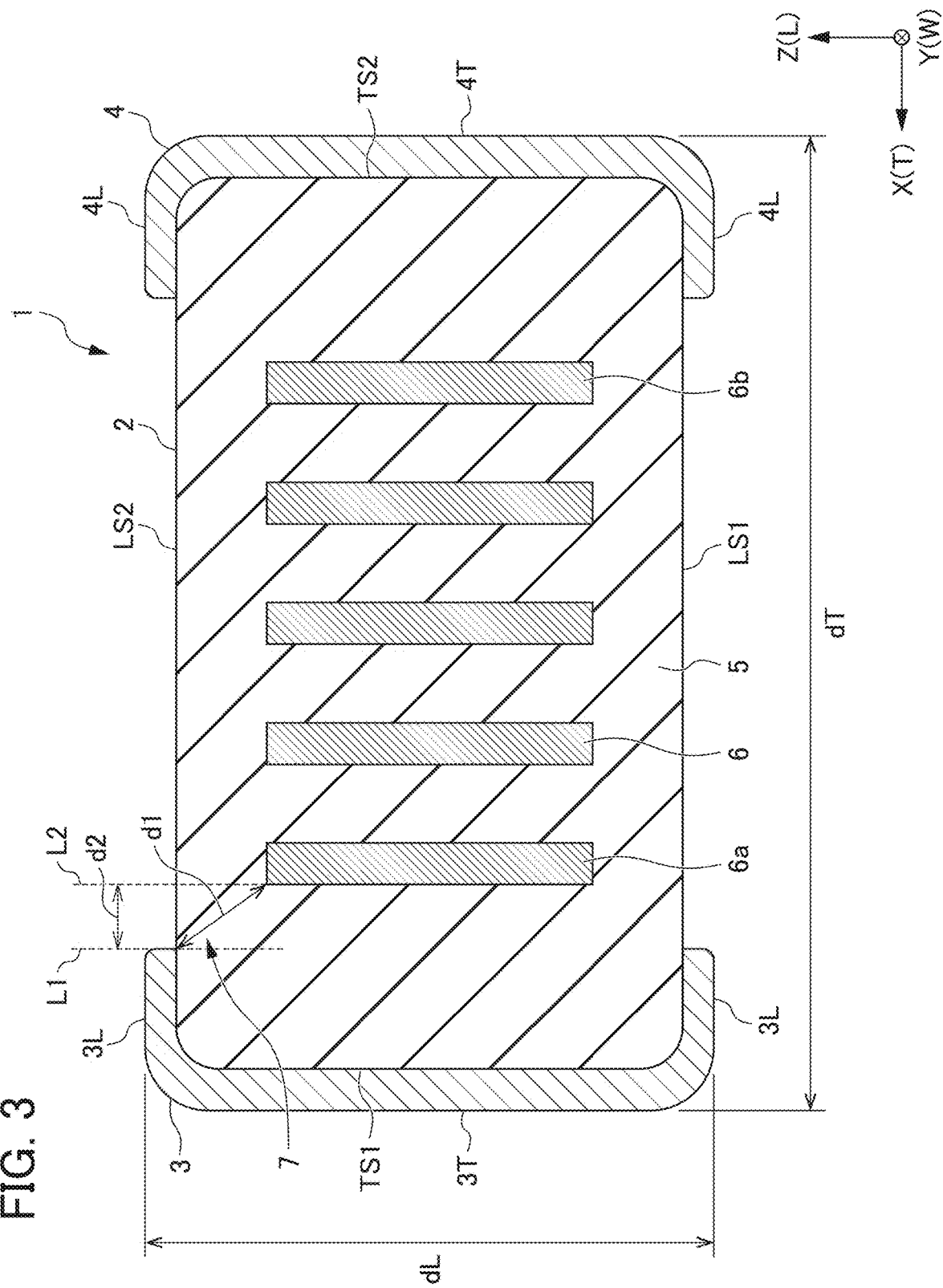
FIG. 3 is a cross-sectional view taken along the line I-I of the multilayer ceramic capacitor shown in FIG. 1.
Figure 4:
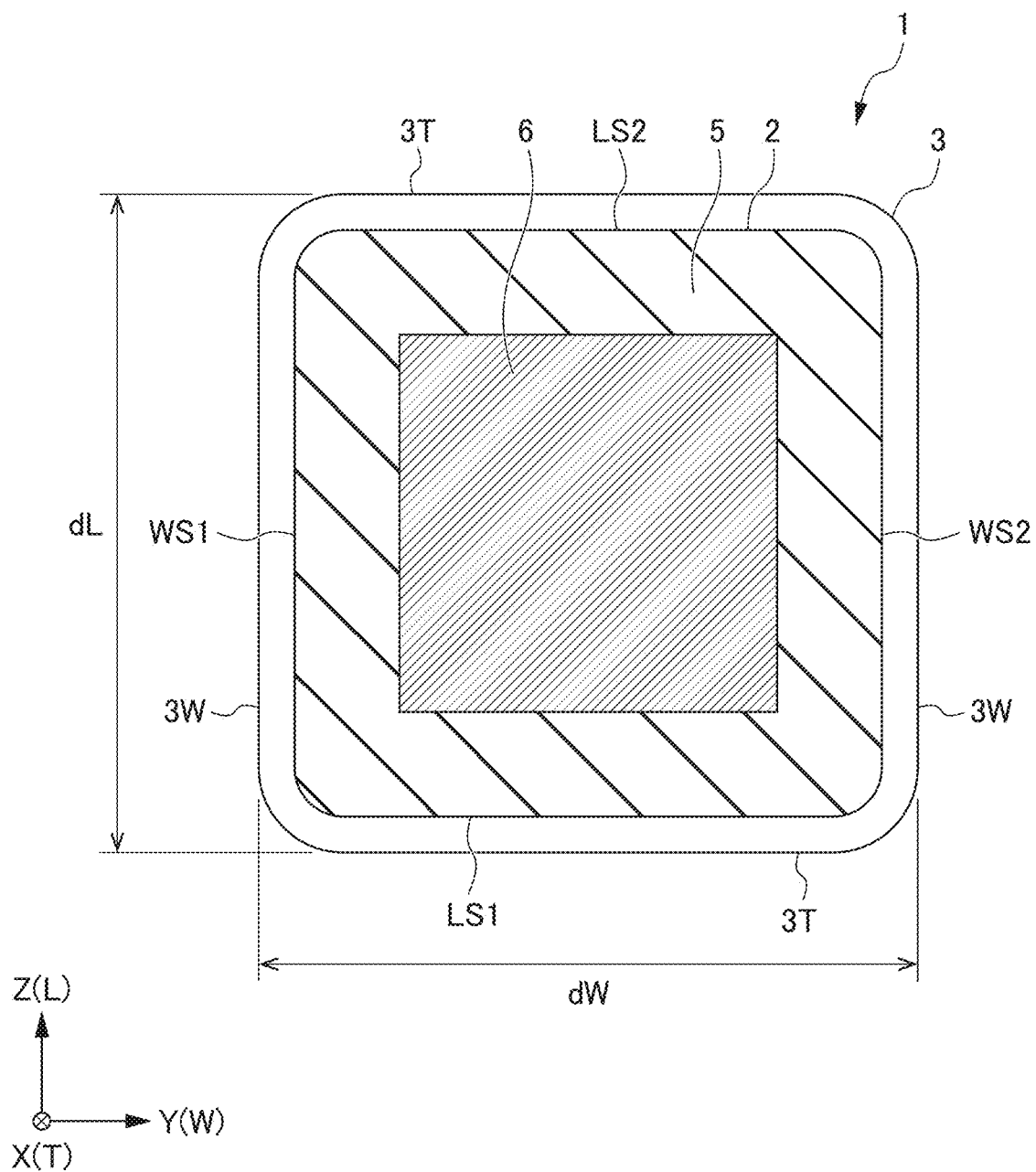
FIG. 4 is a cross-sectional view taken along the line II-II of the multilayer ceramic capacitor shown in FIG. 1.

The structure of the multilayer ceramic capacitor 1 will be described with reference to FIGS. 1 to 4. FIGS. 1 and 2 are perspective views, each showing a multilayer ceramic capacitor 1 of a preferred embodiment of the present invention. FIG. 3 is a cross-sectional view taken along the line I-I of the multilayer ceramic capacitor shown in FIG. 1. FIG. 4 is a cross-sectional view taken along the line II-II of the multilayer ceramic capacitor shown in FIG. 1. In FIG. 2, members other than internal electrode layers 6 are illustrated as being transparent. This is because the configuration of the internal electrode layers 6 in the multilayer ceramic capacitor 1 is shown. As shown in FIGS. 1 and 2, the multilayer ceramic capacitor 1 includes a multilayer body 2 and external electrodes. The external electrodes include a first external electrode 3 and a second external electrode 4. As shown in FIG. 2, the multilayer body 2 includes a plurality of laminated dielectric layers 5 and a plurality of internal electrode layers 6 laminated on the dielectric layers 5.

Definitions of Directions

FIGS. 1 to 4 each show an XYZ orthogonal coordinate system. The X direction refers to the lamination (stacking) direction T of the multilayer ceramic capacitor 1, the Y direction refers to the width direction W of the multilayer ceramic capacitor 1, and the Z direction refers to the length direction L of the multilayer ceramic capacitor 1. Thus, the cross section shown in FIG. 3 is also referred to as an LT cross section, and the cross section shown in FIG. 4 is also referred to as an LW cross section. The length direction L, the width direction W, and the lamination direction T are not necessarily orthogonal or substantially orthogonal to each other, and may intersect each other.

Configuration of Multilayer Body

As shown in FIG. 1, the multilayer body 2 has a rectangular or substantially rectangular parallelepiped shape. The multilayer body 2 includes a first main surface TS1 and a second main surface TS2 which are opposed to each other in the lamination direction T, a first lateral surface WS1 and a second lateral surface WS2 which are opposed to each other in the width direction W, and a first end surface LS1 and a second end surface LS2 which are opposed to each other in the length direction L. The corner portions and ridge portions of the multilayer body 2 are preferably rounded. The corner portions are each a portion where three surfaces of the multilayer body 2 intersect, and the ridge portions are each a portion where two surfaces of the multilayer body 2 intersect. The internal electrode layers 6 included in the multilayer body 2 will be described later.

Configuration of External Electrode

The external electrodes will be described with reference to FIGS. 1 and 2. The external electrode includes the first external electrode 3 and the second external electrode 4 as described above.

First External Electrode

The first external electrode 3 is an external electrode provided on the first main surface TS1 of the multilayer body 2. The first external electrode 3 extends from the first main surface TS1 to a portion of the first end surface LS1, a portion of the second end surface LS2, a portion of the first lateral surface WS1, and a portion of the second lateral surface WS. In the first external electrodes 3, a portion of the first external electrode 3 provided on the first main surface TS1 of the multilayer body 2 is referred to as a first main surface electrode portion 3T, the portion of the first external electrode 3 extending to the first end surface LS1 or the second end surface LS2 is referred to as a first end surface electrode portion 3L, and the portion of the first external electrode 3 extending to the first lateral surface WS1 or the second lateral surface WS2 is referred to as a first lateral surface electrode portion 3W.

Second External Electrode

The second external electrode 4 is an external electrode provided on the second main surface TS2 of the multilayer body 2. The second external electrode 4 includes the same structure as the first external electrode 3. That is, the second external electrode 4 extends from the second main surface TS2 to a portion of the first end surface LS1, a portion of the second end surface LS2, a portion of the first lateral surface WS1, and a portion of the second lateral surface WS2. In the second external electrode 4, a portion provided on the second main surface TS2 of the multilayer body 2 is referred to as a second main surface electrode portion 4T, the portion of the second external electrode 4 extending to the first end surface LS1 or the second end surface LS2 is referred to as a second end surface electrode portion 4L, and a portion of the second external electrode 4 extending to the first lateral surface WS1 or the second lateral surface WS2 is referred to as a second lateral surface electrode portion 4W.

Internal Electrode Layer

The internal electrode layer 6 will be described with reference to FIGS. 2 to 4. As shown in FIG. 2, the internal electrode layers 6 each has a square or substantially square shape in a planar view from the lamination direction T. Here, the planar view from the lamination direction T indicates that the internal electrode layer 6 is viewed in a planar view from the lamination direction T. The plurality of internal electrode layers 6 are laminated with the dielectric layer 5 interposed therebetween. In FIGS. 2 and 3, the number of laminated internal electrode layers 6 is five. This is an example, and the number of laminated internal electrode layers 6 may be appropriately set within a range of 200 or less, for example.

Connection Between Internal Electrode Layer and External Electrode

In the multilayer ceramic capacitor 1 of the present preferred embodiment, the internal electrode layers 6 are not connected to either the first external electrode 3 or the second external electrode 4. As shown in the LT cross section of FIG. 3 and the LW cross section of FIG. 4, the dielectric layer 5 exists between the first external electrode 3 and the second external electrode 4, and any of the internal electrode layers 6.

Capacitance

In the multilayer ceramic capacitor 1 of the present preferred embodiment, the internal electrode layers 6 are not electrically connected to either the first external electrode 3 or the second external electrode 4. Therefore, it is possible to lower the capacitance of the multilayer ceramic capacitor 1.

Lamination Direction of Internal Electrode Layers

As shown in FIG. 2, in the multilayer ceramic capacitor 1 of the present preferred embodiment, the direction in which the first external electrode 3 and the second external electrode 4 are opposed to each other is the lamination direction T of the internal electrode layers 6. In other words, the first external electrode 3 and the second external electrode 4 are provided respectively on the first main surface TS1 and the second main surface TS2 opposite to each other in the lamination direction T.

Influence of the "e" Dimension

In the multilayer ceramic capacitor 1 of the present preferred embodiment, external electrodes are provided on two main surfaces opposite to each other in the lamination direction T. Therefore, it is easy to reduce or prevent the influence of the e dimension. A portion where the distance between the internal electrode layer 6 and the first external electrode 3 or the second external electrode 4 is shortest is referred to as a proximity portion 7. The "e dimension" refers to the distance of the proximity portion 7. A description will be given with reference to FIG. 3. When the first external electrode 3 is taken as an example, the e dimension refers to the length d1 shown in FIG. 3. Among the internal electrode layers 6, the internal electrode layer 6 located closest to the first main surface TS1 is referred to as an internal electrode layer 6a. The portion where the distance between the internal electrode layer 6a and the first end surface electrode portion 3L is shortest is the proximity portion 7. The length d1 of the proximity portion 7 is the e dimension. Hereinafter, the e dimension may be denoted as e dimension d1.

Stray Capacitance

Stray capacitance tends to occur in a portion where the distance between the internal electrode layer 6 and the first external electrode 3 or the second external electrode 4 is short. The stray capacitance is a capacitance component that is not intended by a designer due to a physical structure. The stray capacitance is particularly problematic when the capacitance of the multilayer ceramic capacitor 1 is small, for example, when the design value of the capacitance is an ultralow capacitance such as about 0.1 pF or about 0.05 pF. This is because the ratio of the stray capacitance to the design value of the capacitance increases. Thus, the generation of the stray capacitance prevents the design value of the capacitance from being realized with a narrow deviation.

The stray capacitance tends to occur in the proximity portion 7. Furthermore, as the length d1 of the proximity portion 7 becomes smaller, in other words, as the e dimension d1 becomes smaller, the stray capacitance tends to be generated.

Lamination Direction and the "e" Dimension

The relationship between the lamination of the internal electrode layers 6 and the e dimension d1 will be described. In order to reduce or prevent, for example, equivalent series resistance (ESR), it may be preferable to increase the number of laminated internal electrode layers 6. In this case, if the lamination direction T of the internal electrode layers 6 is the length direction L, it may not be easy to sufficiently lengthen the e dimension d1. When the multilayer ceramic capacitor 1 includes two external electrodes, the multilayer ceramic capacitor 1 is mounted on a board such that the direction in which the external electrodes are opposed to each other is parallel or substantially parallel to the board. Therefore, the length in the direction orthogonal or substantially orthogonal to the direction in which the external electrodes are opposed to each other is preferably reduced. This is for reducing the height of the components of the multilayer ceramic capacitor 1. Therefore, the length in the length direction L of the multilayer ceramic capacitor 1 is usually shorter than the length in the lamination direction T.

As described above, when the internal electrode layers 6 are laminated in the length direction L, the e dimension d1 tends to be short. In other words, when the number of laminated internal electrode layers 6 is the same, the distance between the internal electrode layers 6 positioned on both sides in the lamination direction and the external electrode tends to be shorter when the internal electrode layers 6 are laminated in the length direction L than when they are laminated in the lamination direction T. This is because the length in the length direction L of the multilayer ceramic capacitor 1 is shorter than the length in the lamination direction T. On the other hand, when the internal electrode layers 6 are laminated in the direction in which the external electrodes are opposed to each other, i.e., in the lamination direction T, it becomes easy to set the e dimension d1 longer. This is because the length of the multilayer ceramic capacitor 1 in the lamination direction T is longer than the length of the multilayer ceramic capacitor 1 in the length direction L. In the multilayer ceramic capacitor 1 of the present preferred embodiment, the internal electrode layers 6 are laminated in the direction in which the first external electrode 3 and the second external electrode 4 are opposed to each other. Therefore, it is easy to sufficiently lengthen the e dimension d1. Therefore, it becomes easy to reduce or prevent the generation of stray capacitance.

Overlapping of Internal Electrode Layer and External Electrode

The internal electrode layer 6 does not overlap with either the first external electrode 3 or the second external electrode 4 in a planar view from the second end surface LS2. Here, the planar view from the second end surface LS2 indicates, for example, a planar view of the multilayer ceramic capacitor 1 in the direction from the second end surface LS2 to the first end surface LS1. A description will be given with reference to FIG. 3. In FIG. 3, a tip of the first end surface electrode portion 3L adjacent to the second main surface TS2 is indicated by a line L1. Furthermore, a tip of the internal electrode layer 6a adjacent to the first main surface TS1 is indicated by a line L2. As described above, the internal electrode layer 6a is the internal electrode layer 6 located closest to the first main surface TS1 among the internal electrode layers 6. L2 is provided closer to the second main surface TS2 than L1, so that a distance d2 is provided between L1 and L2. With such a configuration, the internal electrode layer 6 and the first external electrode 3, in particular, the internal electrode layer 6a and the first end surface electrode portion 3L, can be prevented from overlapping each other in a planar view. The internal electrode layer 6b adjacent to the second main surface TS2 is also provided in the same manner as the internal electrode layer 6a. Furthermore, the internal electrode layer 6b is the internal electrode layer 6 located closest to the second main surface TS2 among the internal electrode layers 6.

In the multilayer ceramic capacitor 1 of the present preferred embodiment, the internal electrode layer 6 does not overlap with either the first external electrode 3 or the second external electrode 4. This makes it possible to lengthen the e dimension d1. As a result, it is possible to reduce or prevent generation of stray capacitance. In addition, it is possible to reduce or prevent short circuiting between the internal electrode layer 6 and the first external electrode 3 and the second external electrode 4. In particular, it is possible to reduce or prevent short circuiting between the internal electrode layer 6a and the first end surface electrode portion 3L and short circuiting between the internal electrode layer 6b and the second end surface electrode portion 4L.

Furthermore, it is possible to maintain the mechanical strength of the multilayer ceramic capacitor 1. This is because it is possible to secure the dielectric layer 5 having a sufficient thickness between the internal electrode layer 6, and the first external electrode 3 and the second external electrode 4.

Second Preferred Embodiment

Figure 5:
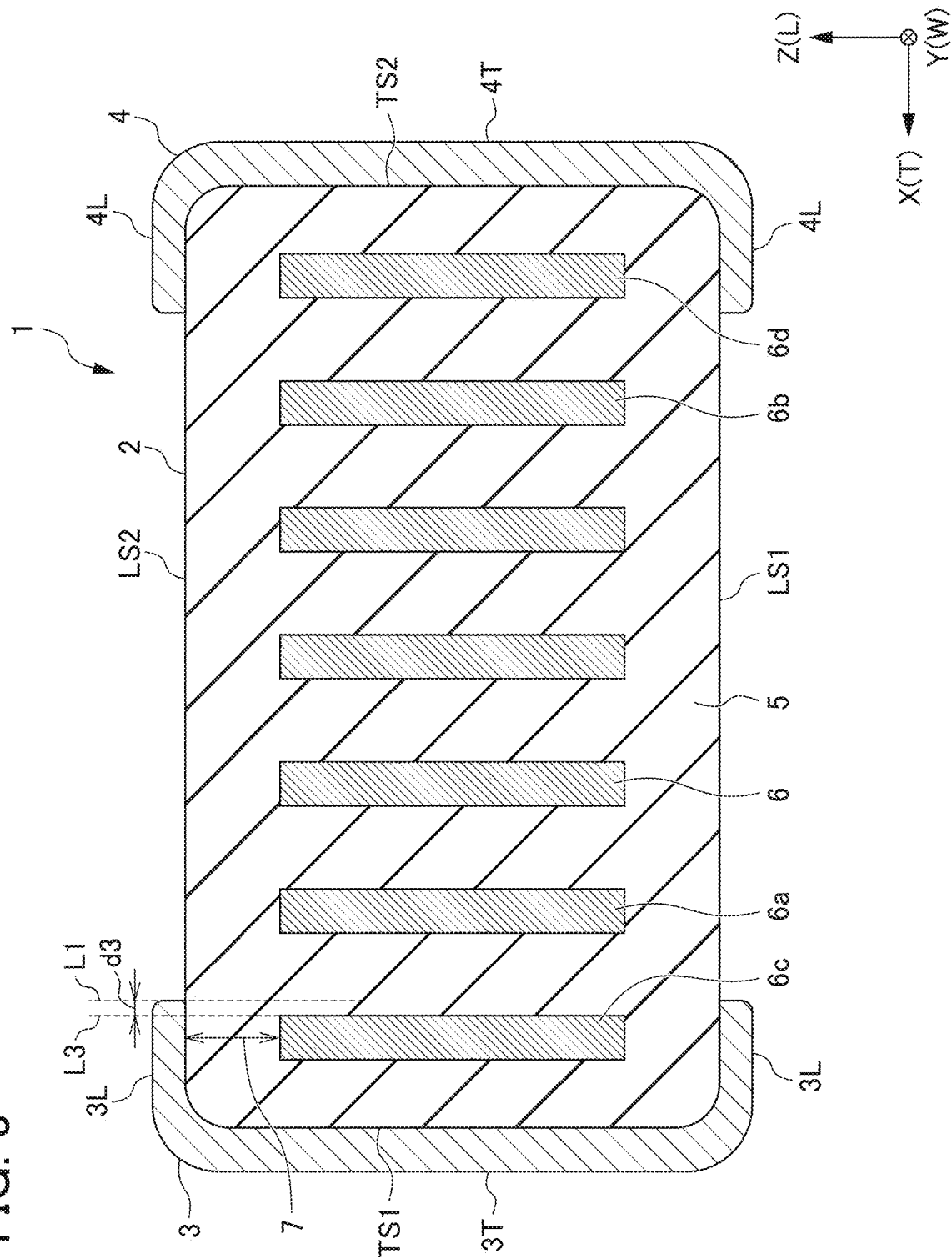
FIG. 5 is a cross-sectional view taken along the line I-I of a multilayer ceramic capacitor according to another preferred embodiment of the present invention.

A second preferred embodiment of the multilayer ceramic capacitor 1 of the present invention will be described. The following description focuses on differences from the multilayer ceramic capacitor 1 of the first preferred embodiment. FIG. 5 is a diagram showing a multilayer ceramic capacitor 1 according to a second preferred embodiment. FIG. 5 is a cross-sectional view taken along the line I-I of FIG. 1, and is a view showing an LT cross section of the multilayer ceramic capacitor 1 of the second preferred embodiment. As shown in FIG. 5, the multilayer ceramic capacitor 1 of the second preferred embodiment is different from the multilayer ceramic capacitor 1 of the first preferred embodiment in the following configuration. That is, in the first preferred embodiment, the internal electrode layer 6 does not overlap with the external electrode in a planar view from the second end surface LS2; whereas, in the second preferred embodiment, the internal electrode layer 6 overlaps with the external electrode in a planar view from the second end surface LS2.

As shown in FIG. 5, in the second preferred embodiment, an internal electrode layer 6c is further provided between the internal electrode layer 6a and the first external electrode 3 described in the first preferred embodiment. Similarly, an internal electrode layer 6d is further provided between the internal electrode layer 6b and the second external electrode 4. The internal electrode layer 6c and the internal electrode layer 6d overlap with the external electrode in a planar view from the second end surface LS2. That is, the internal electrode layer 6c overlaps with the first external electrode 3, in particular, the first end surface electrode portion 3L in a planar view from the second end surface LS2. Similarly, the internal electrode layer 6d overlaps with the second external electrode 4, in particular, the second end surface electrode portion 4L in planar view from the second end surface LS2.

The internal electrode layer 6c will be described as an example. In FIG. 5, a tip of the internal electrode layer 6c adjacent to the second main surface TS2 is indicated by the line L3. As described above, the line L1 indicates the tip of the first end surface electrode portion 3L adjacent to the second main surface TS2. L3 is provided closer to the first main surface TS1 than L1, so that a distance d3 is provided between L1 and L3. With such a configuration, it is possible for the internal electrode layer 6 and the first external electrode 3, in particular, the internal electrode layer 6c and the first end surface electrode portion 3L, to overlap with each other in a planar view from the second end surface LS2. The internal electrode layer 6d adjacent to the second main surface TS2 is also provided in the same manner as the internal electrode layer 6c. Furthermore, the internal electrode layer 6d is an internal electrode layer 6 located closest to the second main surface TS2 among the internal electrode layers 6.

As described above, at least one layer of the internal electrode layers 6 overlaps with the first external electrode 3 in a planar view from the second end surface LS2, and at least one other layer of the internal electrode layers 6 overlaps with the second external electrode 4 in a planar view from the second end surface LS2, such that it is possible to increase the degree of freedom in determining the set value of the capacitance of the multilayer ceramic capacitor 1.

A description will be given with reference to FIG. 5. When the internal electrode layer 6c is taken as an example, a portion between the internal electrode layer 6c and the first end surface electrode portion 3L corresponds to a proximity portion 7. As described above, the proximity portion 7 is a portion where the distance between the internal electrode layer 6 and the first external electrode 3 or the second external electrode 4 is shortest.

In the second preferred embodiment, it is possible to generate the capacitance intentionally in the proximity portion 7. With such a configuration, it is possible to increase the degree of freedom in setting the capacitance of the multilayer ceramic capacitor 1.

Furthermore, it is possible to increase the region where the internal electrode layer 6 is provided. Therefore, it is possible to increase the number of internal electrode layers 6. As a result, it is possible to further reduce or prevent ESR.

Third Preferred Embodiment

Figure 6:
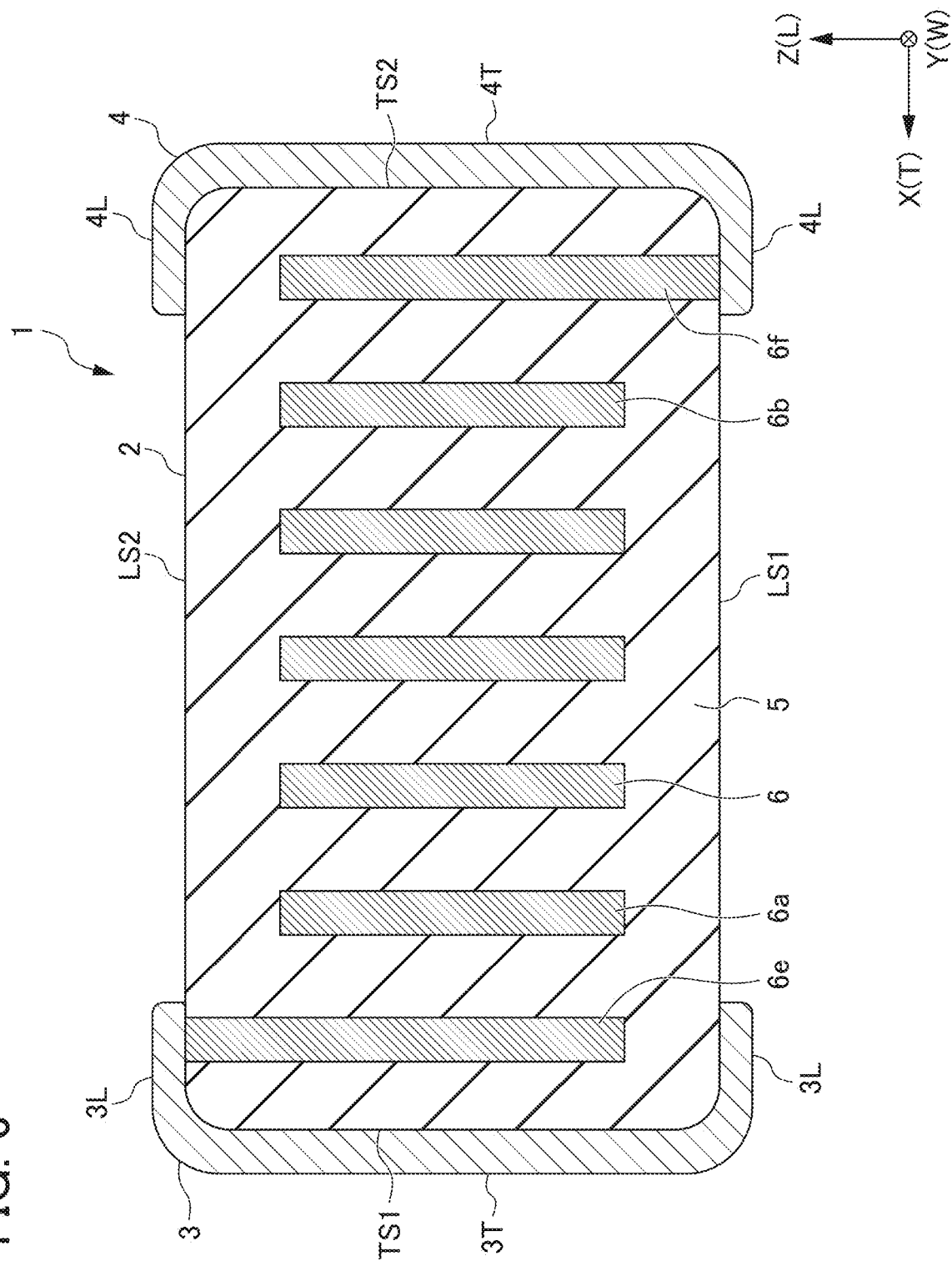
FIG. 6 is a cross-sectional view taken along the line I-I of a multilayer ceramic capacitor according to another preferred embodiment of the present invention.

A third preferred embodiment of the multilayer ceramic capacitor 1 of the present invention will be described. The following description focuses on differences from the multilayer ceramic capacitor 1 of the second preferred embodiment. FIG. 6 is a diagram showing a multilayer ceramic capacitor 1 according to a third preferred embodiment. FIG. 6 is a cross-sectional view taken along the line I-I of FIG. 1, and is a view showing an LT cross section of the multilayer ceramic capacitor 1 of the third preferred embodiment.

As shown in FIG. 6, the multilayer ceramic capacitor 1 of the third preferred embodiment is different from the multilayer ceramic capacitor of the second preferred embodiment in the following configuration. That is, in the second preferred embodiment, the internal electrode layer 6 is not connected to the external electrode. On the other hand, in the third preferred embodiment, the internal electrode layer 6 is connected to the external electrode. More specifically, in the second preferred embodiment, the internal electrode layer 6e overlaps with the first external electrode 3 in a planar view from the second end surface LS2. However, the internal electrode layer 6e is not connected to the first external electrode 3. In contrast, in the third preferred embodiment, the internal electrode layer 6e is connected to the first external electrode 3. More specifically, the internal electrode layer 6e is connected to the first end surface electrode portion 3L at the second end surface LS2. Similarly, in the third preferred embodiment, the internal electrode layer 6f is connected to the second external electrode 4. More specifically, the internal electrode layer 6f is connected to the second end surface electrode portion 4L at the first end surface LS1.

With such a configuration, it is possible to adjust the capacitance by using the internal electrode layer 6e and the internal electrode layer 6f connected to the external electrode in addition to the internal electrode layers 6 not connected to the external electrode. Therefore, it is possible to increase the degree of freedom of capacitance adjustment.

In the example shown in FIG. 6, the internal electrode layer 6e and the internal electrode layer 6f are connected to external electrodes on different surfaces of the multilayer body 2. That is, the internal electrode layer 6e is connected to the first end surface electrode portion 3L at the second end surface LS2 of the multilayer body 2. On the other hand, the internal electrode layer 6f is connected to the second end surface electrode portion 4L at the first end surface LS1 of the multilayer body 2. However, the configuration of the connection between the internal electrode layer 6 and the external electrode is not limited to the configuration shown in FIG. 6. For example, the internal electrode layer 6e and the internal electrode layer 6f may be connected to the external electrode on the same surface of the multilayer body 2. That is, similarly to the internal electrode layer 6e, the internal electrode layer 6f may also be connected to the second end surface electrode portion 4L at the second end surface LS2 of the multilayer body 2. As shown in FIG. 6, when the internal electrode layer 6e and the internal electrode layer 6f are connected to the external electrode on different surfaces of the multilayer body 2, it is possible to uniformly distribute the internal stress of the multilayer body 2. Therefore, it is possible to reduce the occurrence of cracks or interlayer peeling in the multilayer body 2.

Hereinafter, materials and the like of each portion will be described.

Material for Dielectric Layer (CT System)

The dielectric layer 5 of each preferred embodiment of the present invention includes, as a main component, a ceramic material including at least one selected from Ca, Zr, and Ti. More specifically, for example, a ceramic material having a perovskite structure represented by the general formula $ABO_3$ including Ca and Zr is used as a main component. Examples of the ceramic material having such a perovskite structure include, but are not limited to, $CaZrO_3$ (calcium zirconate) and $TiO_2$ (titanium oxide). The main component for the ceramic material of the dielectric layer 5 may include all of Ca, Zr, and Ti. Alternatively, $Ca(Zr_{0.9}Ti_{0.1})O_3$ or the like obtained by replacing $ZrO_3$ or a portion of Zr with Ti in $CaZrO_3$ may be used.

Preferably, the dielectric layer 5 of each preferred embodiment of the present invention includes Ca, Sr, Ti and Zr. When Zr is about 100 mol, the dielectric layer 5 preferably includes Ca and Sr such that the sum of Ca and Sr is about 60 mol or more and about 110 mol or less, and includes Ti of about 20 mol or less.

As a ceramic material for the dielectric layer 5, $(Ca_{1-x-y}, Sr_x, Ba_y)_m (Zr_{1-z-a}, Ti_z, Hf_a)O_3$ (where x is about 0 or more and about 1 or less, y is about 0 or more and about 0.4 or less, m is about 0.9 or more and about 1.1 or less, z is about 0 or more and about 0.2 or less, and a is about 0 or more and about 0.3 or less) or the like may be used.

Additives may be added to the ceramic material for the dielectric layer 5 depending on the purpose. Examples of such additives include oxides of Mn, Mg, Dy, Cr, oxides of rare earth elements such as V, Sm, Eu, Gd, Tb, Ho, Er, Tm, Yb, and Y, oxides of Co, Ni, Li, B, Na, K, and Si, and glass.

Material for Dielectric Layer (BT System)

The material for the dielectric layer 5 may be, for example, a ceramic material including a component such as $BaTiO_3$, $CaTiO_3$, $SrTiO_3$, or $CaZrO_3$. Furthermore, Mn compound, Fe compound, Cr compound, Co compound, Ni compound, or the like may be added as a subcomponent to the ceramic material.

Thickness and Number of Dielectric Layers

The thickness of the dielectric layer 5 is not particularly limited, but is preferably about 0.5 μm or more and about 3.0 μm or less, for example. When the thickness of the dielectric layer 5 is about 2.0 μm or more, the distance between the adjacent internal electrode layers 6 is more preferably about 2.0 μm or more. The number of dielectric layers 5 is not particularly limited, but is preferably 200 or less.

Material for Internal Electrode Layer (Material Corresponding to CT System)

The internal electrode layers 6 are each a conductive thin film including a metal such as Ni, Cu, Ag, Pd, an alloy of Ag and Pd, or Au. In order to obtain good frequency characteristics of the multilayer ceramic capacitor 1, Cu is preferably used as the internal electrode layer 6. The internal electrode layer 6 may further include dielectric particles having the same composition as the ceramic included in the dielectric layer 5.

Material for Internal Electrode Layer (Material Corresponding to BT System)

The internal electrode layer 6 may include, for example, Ni as a main component. Furthermore, the internal electrode layer 6 may include, as a main component, at least one selected from a metal such as Cu, Ag, Pd, or Au, or an alloy including at least one of these metals such as an Ag—Pd alloy. The internal electrode layer 6 may include these materials as components other than the main component. Furthermore, the internal electrode layer 6 may include dielectric particles having the same composition as the ceramic included in the dielectric layer 5 as components other than the main component. In this specification, the metal of the main component refers to a metal component having the highest mass %.

Thickness and Number of Internal Electrode Layers

The thickness of the internal electrode layer 6 is not particularly limited, but may be, for example, about 1.0 μm or more and about 3.0 μm or less. The total number of internal electrode layers 6 is not particularly limited, but is preferably 200 or less.

Material for External Electrode

The first external electrode 3 and the second external electrode 4 each have a base electrode, an inner plated layer, and a surface plated layer. The base electrode may be a fired layer including metal and glass. The metal includes Cu as a main component. Furthermore, the metal may include at least one selected from a metal such as Ni, Ag, Pd, or Au or an alloy such as Ag—Pd alloy as a main component, or may include a component other than the main component. Examples of the glass include glass components including at least one selected from B, Si, Ba, Mg, Al, Li, and the like. As a specific example, borosilicate glass may be used. The inner plated layer may be made of at least one selected from a metal such as Cu, Ni, Ag, Pd, or Au, or an alloy such as Ag—Pd alloy. The surface plated layer, for example, may be made of a metal such as Sn.

Outer Dimensions of Multilayer Ceramic Capacitor 1

The outer dimensions of the multilayer ceramic capacitor 1 is not particularly limited. Preferred dimensions are described below. As shown in FIG. 2, the outer shape of the multilayer ceramic capacitor 1 has the dimension dT in the lamination direction T, the dimension dW in the width direction W, and the dimension dL in the length direction L.

Dimension dT

More specifically, a distance between the outer surface of the first main surface electrode portion 3T and the outer surface of the second main surface electrode portion 4T is defined as a dimension dT. The outer surface indicates a surface on the side where the external electrode is not in contact with the multilayer body 2 in the direction in which the dimension is to be measured. The same applies to the following description.

Dimension dW

A distance between the outer surface of the first lateral surface electrode portion 3W on the first lateral surface WS1 and the outer surface of the first lateral surface electrode portion 3W on the second lateral surface WS2 is defined as a dimension dW. The distance between the outer surface of the second lateral surface electrode portion 4W on the first lateral surface WS1 and the outer surface of the second lateral surface electrode portion 4W on the second lateral surface WS2 is equal to dW.

Dimension dL

A distance between the outer surface of the first end surface electrode portion 3L on the first end surface LS1 and the outer surface of the first end surface electrode portion 3L on the second end surface LS2 is defined as a dimension dL. The distance between the outer surface of the second end surface electrode portion 4L on the first end surface LS1 and the outer surface of the second end surface electrode portion 4L on the second end surface LS2 is equal to dL. These dimensions preferably satisfy dT>dW or dT>dL. With such a configuration, it is possible to secure the length of the laminated body 2 in the lamination direction sufficiently, and it is possible to increase the number of laminated internal electrode layers 6. As a result, it is easy to reduce or prevent the equivalent series resistance.

The dimension dT of the multilayer ceramic capacitor 1 may be, for example, about 0.20 mm or more and about 0.65 mm or less, and the dimension dW and the dimension dL may be about 0.10 mm or more and about 0.35 mm or less.

Measuring Method

Examples of a method of measuring the lengths of the dielectric layer 5 and the internal electrode layer 6 include a method of observing with a scanning electron microscope the cross section of the multilayer body 2 exposed by polishing. Furthermore, each value may be an average value of measurement values at a plurality of locations corresponding to a portion to be measured.

Manufacturing Method

An example of a general manufacturing method of the multilayer ceramic capacitor 1 will be described. First, a dielectric sheet for manufacturing the dielectric layer 5 and a conductive paste for manufacturing the internal electrode layer 6 are prepared. The dielectric sheet and the conductive paste include a binder and a solvent. As the binder and the solvent, well-known materials can be used. An internal electrode layer pattern is formed on the dielectric sheet by printing a conductive paste on the dielectric sheet in the pattern of the internal electrode layer 6. As a method of forming the internal electrode layer pattern, screen printing, gravure printing, or the like can be used.

A predetermined number of dielectric sheets for the outer layers having no internal electrode layer pattern printed thereon are laminated. Dielectric sheets for the inner layer on which an internal electrode layer pattern is printed are sequentially laminated thereon. At this time, a dielectric paste for thickness correction may be appropriately applied if necessary at a position corresponding to each side gap portion. A predetermined number of dielectric sheets for the outer layers having no internal electrode layer pattern printed thereon are laminated thereon. Thus, a multilayer sheet is produced.

Next, the multilayer sheet is pressed in the laminating direction by hydrostatic pressing or other method to prepare a multilayer block. Next, the multilayer block is cut into a predetermined size, so that the multilayer chip is cut out. At this time, the corner portions and ridge portions of the multilayer chip are rounded by barrel polishing or the like. Next, the multilayer chip is fired to prepare a multilayer body 2. The firing temperature is preferably about 900° C. or higher and about 1400° C. or lower, although it depends on the material of the dielectric and the internal electrode layer.

Next, by forming the first external electrode 3 and the second external electrode 4 by a predetermined method, the multilayer ceramic capacitor 1 can be obtained.

Although the preferred embodiments of the present invention have been described above, the present invention is not limited to the preferred embodiments described above, and various changes and modifications are possible.

A multilayer ceramic capacitor 1 according to a preferred embodiment of the present invention can also be described as follows.

A multilayer ceramic capacitor according to a preferred embodiment of the present invention includes a multilayer body including a plurality of laminated dielectric layers, a plurality of internal electrode layers laminated on the dielectric layers, a first main surface and a second main surface which are opposed to each other in a lamination direction, a first lateral surface and a second lateral surface which are opposed to each other in a width direction orthogonal or substantially orthogonal to the lamination direction, and a first end surface and a second end surface which are opposed to each other in a length direction orthogonal or substantially orthogonal to the lamination direction and the width direction, and a first external electrode on the first main surface and a second external electrode on the second main surface, in which a portion or all of the plurality of internal electrode layers are not connected to any of the first external electrode or the second external electrode.

In a multilayer ceramic capacitor according to a preferred embodiment of the present invention, the plurality of dielectric layers each include Ca, Sr, Ti, and Zr.

In a multilayer ceramic capacitor according to a preferred embodiment of the present invention, when Zr is about 100 mol, the plurality of dielectric layers each include Ca and Sr such that a sum of Ca and Sr is about 60 mol or more and about 110 mol or less, and include about 20 mol or less of Ti.

In a multilayer ceramic capacitor according to a preferred embodiment of the present invention, the plurality of dielectric layers each include a composition represented by $(Ca_{1-x-y}, Sr_x, Ba_y)_m (Zr_{1-z-\alpha}, Ti_z, Hf_\alpha)O_3$, where $x$ is about 0 or more and about 1 or less, $y$ is about 0 or more and about 0.4 or less, $m$ is about 0.9 or more and about 1.1 or less, $z$ is about 0 or more and about 0.2 or less, and $\alpha$ is about 0 or more and about 0.3 or less.

In a multilayer ceramic capacitor according to a preferred embodiment of the present invention, the first external electrode extends from the first main surface to a portion of the first end surface, a portion of the second end surface, a portion of the first lateral surface, and a portion of the second lateral surface, the second external electrode extends from the second main surface to a portion of the first end surface, a portion of the second end surface, a portion of the first lateral surface, and a portion of the second lateral surface, when a distance between an outer surface of the first external electrode on the first main surface and an outer surface of the second external electrode on the second main surface is defined as dT, a distance between an outer surface of the first external electrode on the first lateral surface and an outer surface of the first external electrode on the second lateral surface is defined as dW, and a distance between an outer surface of the first external electrode on the first end surface and an outer surface of the first external electrode on the second end surface is defined as dL, and dT, dW, and dT satisfy a relationship of dT>dW or dT>dL.

In a multilayer ceramic capacitor according to a preferred embodiment of the present invention, the first external electrode extends from the first main surface to a portion of the first end surface, a portion of the second end surface, a portion of the first lateral surface, and a portion of the second lateral surface, the second external electrode extends from the second main surface to a portion of the first end surface, a portion of the second end surface, a portion of the first lateral surface, and a portion of the second lateral surface, and the plurality of internal electrode layers do not overlap with any of the first external electrode or the second external electrode in a planar view from the second end surface.

In a multilayer ceramic capacitor according to a preferred embodiment of the present invention, the first external electrode extends from the first main surface to a portion of the first end surface, a portion of the second end surface, a portion of the first lateral surface, and a portion of the second lateral surface, the second external electrode extends from the second main surface to a portion of the first end surface, a portion of the second end surface, a portion of the first lateral surface, and a portion of the second lateral surface, at least one layer of the plurality of internal electrode layers overlaps with the first external electrode in a planar view from the second end surface, and at least one other layer of the plurality of internal electrode layers overlaps with the second external electrode in the planar view from the second end surface.

In a multilayer ceramic capacitor according to a preferred embodiment of the present invention, the at least one layer overlapping with the first external electrode is connected to the first external electrode, and the at least one other layer overlapping with the second external electrode is connected to the second external electrode.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
a multilayer body including a plurality of laminated dielectric layers, a plurality of internal electrode layers laminated on the dielectric layers, a first main surface and a second main surface which are opposed to each other in a lamination direction, a first lateral surface and a second lateral surface which are opposed to each other in a width direction orthogonal or substantially orthogonal to the lamination direction, and a first end surface and a second end surface which are opposed to each other in a length direction orthogonal or substantially orthogonal to the lamination direction and the width direction; and a first external electrode on the first main surface and a second external electrode on the second main surface; wherein
a portion or all of the plurality of internal electrode layers are not connected to any of the first external electrode or the second external electrode.

2. The multilayer ceramic capacitor according to claim 1, wherein the plurality of dielectric layers each include Ca, Sr, Ti, and Zr.

3. The multilayer ceramic capacitor according to claim 2, wherein, when an amount of Zr is about 100 mol, the plurality of dielectric layers each include Ca and Sr such that a sum of Ca and Sr is about 60 mol or more and about 110 mol or less, and include about 20 mol or less of Ti.

4. The multilayer ceramic capacitor according to claim 2, wherein the plurality of dielectric layers each include a composition represented by $(Ca_{1-x-y}, Sr_x, Ba_y)_m (Zr_{1-z-\alpha}, Ti_z, Hf_\alpha)O_3$, where $x$ is about 0 or more and about 1 or less, $y$ is about 0 or more and about 0.4 or less, $m$ is about 0.9 or more and about 1.1 or less, $z$ is about 0 or more and about 0.2 or less, and $\alpha$ is about 0 or more and about 0.3 or less.

5. The multilayer ceramic capacitor according to claim 1, wherein
the first external electrode extends from the first main surface to a portion of the first end surface, a portion of the second end surface, a portion of the first lateral surface, and a portion of the second lateral surface;
the second external electrode extends from the second main surface to a portion of the first end surface, a portion of the second end surface, a portion of the first lateral surface, and a portion of the second lateral surface;
when a distance between an outer surface of the first external electrode on the first main surface and an outer surface of the second external electrode on the second main surface is defined as dT:
a distance between an outer surface of the first external electrode on the first lateral surface and an outer surface of the first external electrode on the second lateral surface is defined as dW;
a distance between an outer surface of the first external electrode on the first end surface and an outer surface of the first external electrode on the second end surface is defined as dL; and
dT, dW, and dT satisfy a relationship of dT>dW or dT>dL.

6. The multilayer ceramic capacitor according to claim 1, wherein
the first external electrode extends from the first main surface to a portion of the first end surface, a portion of the second end surface, a portion of the first lateral surface, and a portion of the second lateral surface;
the second external electrode extends from the second main surface to a portion of the first end surface, a portion of the second end surface, a portion of the first lateral surface, and a portion of the second lateral surface; and
the plurality of internal electrode layers do not overlap with any of the first external electrode or the second external electrode in a planar view from the second end surface.

7. The multilayer ceramic capacitor according to claim 1, wherein
the first external electrode extends from the first main surface to a portion of the first end surface, a portion of the second end surface, a portion of the first lateral surface, and a portion of the second lateral surface;
the second external electrode extends from the second main surface to a portion of the first end surface, a portion of the second end surface, a portion of the first lateral surface, and a portion of the second lateral surface;
at least one layer of the plurality of internal electrode layers overlaps with the first external electrode in a planar view from the second end surface; and
at least one other layer of the plurality of internal electrode layers overlaps with the second external electrode in the planar view from the second end surface.

8. The multilayer ceramic capacitor according to claim 7, wherein
the at least one layer overlapping with the first external electrode is connected to the first external electrode; and
the at least one other layer overlapping with the second external electrode is connected to the second external electrode.

9. The multilayer ceramic capacitor according to claim 7, wherein
the at least one layer overlapping with the first external electrode is not connected to the first external electrode; and
the at least one other layer overlapping with the second external electrode is not connected to the second external electrode.

10. The multilayer ceramic capacitor according to claim 1, wherein the multilayer body has a rectangular or substantially rectangular parallelepiped shape.

11. The multilayer ceramic capacitor according to claim 1, wherein the multilayer body includes rounded corner portions and rounded ridges.

12. The multilayer ceramic capacitor according to claim 1, wherein the plurality of internal electrodes are laminated in a direction in which the first and second external electrodes are opposed to each other.

13. The multilayer ceramic capacitor according to claim 1, wherein each of the dielectric layers includes Ca, Zr or Ti.

14. The multilayer ceramic capacitor according to claim 1, wherein each of the dielectric layers includes an additive including oxides of Mn, Mg, Dy, or Cr; oxides of rare earth elements, oxides of Co, Ni, Li, B, Na, K, or Si; or glass.

15. The multilayer ceramic capacitor according to claim 1, wherein each of the dielectric layers includes $BaTiO_3$, $CaTiO_3$, $SrTiO_3$, or $CaZrO_3$.

16. The multilayer ceramic capacitor according to claim 1, wherein a thickness of each of the dielectric layers is about 0.5 μm or more and about 3.0 μm or less.

17. The multilayer ceramic capacitor according to claim 1, wherein each of the internal electrodes includes Ni, Cu, Ag, Pd, an alloy of Ag and Pd, or Au.

18. The multilayer ceramic capacitor according to claim 1, wherein each of the internal electrodes includes Cu, Ag, Pd, or Au, or an alloy including at least one of Cu, Ag, Pd, or Au.

19. The multilayer ceramic capacitor according to claim 1, wherein a thickness of each of the internal electrodes is 1.0 μm or more and about 3.0 μm or less.

20. The multilayer ceramic capacitor according to claim 1, wherein each of the first external electrode and the second external electrode includes base electrode, an inner plated layer, and a surface plated layer.

* * * * *